3,150,930
PROCESS FOR THE DEHYDROGENATION OF A TETRAHYDROANTHRAQUINONE TO AN ANTHRAQUINONE
Kizo Hiratsuka, Oiso-machi, Kanagawa-ken, and Eiichi Yonemitsu and Akitoshi Sugio, Tokyo, Japan, assignors to Edogawa Kagaku Kogyo Kabushiki Kaisha, Tokyo, Japan, a corporation
No Drawing. Filed Mar. 28, 1962, Ser. No. 183,022
Claims priority, application Japan, Apr. 3, 1961, 36/11,219
7 Claims. (Cl. 23—207)

This invention relates to a process for the dehydrogenation of a tetrahydroanthraquinone to the corresponding anthraquinone. More particularly it relates to a process for the dehydrogenation of a tetrahydroanthraquinone formed during the course of the production of hydrogen peroxide by a cyclic operation involving the reduction of an anthraquinone and the oxidation of the resultant anthrahydroquinone.

The inventors proposed, in Japanese patent application Sho 35/42,347, a process of the dehydrogenation of tetrahydroanthraquinones to anthraquinones, which comprises contacting tetrahydroanthraquinones with any one compound selected from alumina, magnesia, and alumina-magnesia in spinel form, or a metal which is known to foster hydrogenation in general such as palladium or nickel supported on one of the above mentioned oxides, or a mixture consisting of said substances, and a metal oxide selected from the oxides of copper, silver, lead, mercury or manganese at a reaction temperature from 80–300° C. in an environment of an inert gas. The present invention is practised with greater ease, compared to said process. Another process is described in U.S. Patent No. 2,948,739 for the dehydrogenation of an alkylated tetrahydroanthraquinone, in which the tetrahydroanthraquinone formed in the production of hydrogen peroxide by an anthraquinone process, is dissolved in acetophenone and dehydrogenated in the presence of palladium or Raney nickel supported on activated carbon at a temperature above 150° C.

According to this prior art process the one stage conversion of an alkylated tetrahydroanthraquinone to the corresponding anthraquinones is kept at around 30%, partly because the conversion does not exceed 40% owing to the equilibrium present, and partly because the loss of the alkylated tetrahydroanthraquinone is accelerated when the conversion draws near the equilibrium, said loss being possible to reach over 30%.

The solution subjected to dehydrogenation is cooled after the first stage of dehydrogenation, oxidized with oxygen and submitted to the second stage of dehydrogenation. Thus the total conversion of 70–80% is attained after repeating three times the dehydrogenation process.

With the aim of breaking the equilibrium, which exists when a hydrogenation catalyst alone is employed, to complete the reaction and obtain a quantitative yield, the inventors proposed the aforementioned process.

It has now been found according to this invention that the equilibrium is broken by removing from the reaction system the hydrogen which in turn has been removed from the tetrahydroanthraquinone. This is accomplished by introducing substances which easily react with hydrogen such as olefines into the reaction system, whereby the hydrogen emanating from the tetrahydroanthraquinone hydrogenates the olefines.

The present invention is practised in the following way. A substance selected from alumina, magnesia, alumina-magnesia in spinel form, active carbon, or a carbonate of a metal selected from Group I or II of the Periodic Table, or a mixture of the above mentioned substances, and a metal which is known to foster hydrogenation in general such as palladium, platinum or nickel are added to a solution comprising a tetrahydroanthraquinone. The solution is then contacted with an organic compound having at least one unsaturated bond, at a temperature exceeding 80° C. to lead the dehydrogenation to completion with a quantitative yield.

In the instance where an unsaturated compound is not introduced into the system and the reaction is carried out in an environment of an inert gas such as nitrogen, the conversion of the tetrahydroanthraquinone reaches only 55% and the total anthraquinone recovery is reduced to 70%.

The present invention is characteristic in that the reaction is completed by a simple one stage operation with a quantitative yield.

Another characteristic of the invention is that the working solution, employed in the production of hydrogen peroxide by the so-called anthraquinone process, which consists of a solution comprising an anthraquinone dissolved in solvents such a hydrocarbons, aliphatic alcohols, phosphoric acid esters or acetophenone may be submitted to the dehydrogenation process without any pre-treatment.

By contrast, in the processes described in U.S. Patent No. 2,739,042 and U.S. Patent No. 2,948,739, a tetrahydroanthraquinone is extracted from the working solution prior to the dehydrogenation. Needless to say that the extracted tetrahydroanthraquinone can successfully be dehydrogenated in the process of the present invention.

In accordance with the present invention, the dehydrogenation of a tetrahydroanthraquinone is accomplished with a conversion of 100% and a quantitative total anthraquinone recovery is obtained whether a tetrahydroanthraquinone alone or a mixture of a tetrahydroanthraquinone and an anthraquinone is submitted to the dehydrogenation, and further irrespective of the concentration of the tetrahydroanthraquinone or of the kind of the substituent alkyl radicals on the tetrahydroanthraquinone.

The solvents which are applicable to the process of the present invention include aliphatic or aromatic hydrocarbons, alcohols, ketones, esters and any other solvents, which are stable to usual hydrogenation catalysts.

Concerning the reaction temperature, the dehydrogenation proceeds with a fair velocity at a temperature around 100° C., in general with a sufficient velocity at the boiling point of the solvent employed. The dehydrogenation is completed in 2 hours at a temperature between 150° C. and 160° C., while the boiling points of the solvents generally employed in the anthraquinone process fall within the range of 150–200° C.

The dehydrogenation velocity becomes about twice as high by 10° C. elevation of the reaction temperature. Though the reaction temperature is limited by the thermal stability of tetrahydroanthraquinones, the reaction may be carried out even at a temperature as high as 300° C.

As the dehydrogenation catalyst of the present invention, alumina, magnesia, alumina-magnesia in spinel form, active carbon, and a carbonate of a metal selected from Group I and II of the Periodic Table are used. They are effective in the order of magnesia>spinel>alumina> active carbon>carbonate.

As the hydrogenation catalyst, an usual hydrogenation catalyst such as palladium, platinum or nickel is applicable. Palladium is most conveniently employed in the process of the present invention as in general palladium is employed as the hydrogenation catalyst of an anthraquinone to the corresponding hydroanthraquinone in the anthraquinone process.

The amount of palladium sufficient for the process is about 1% based on the weight of the carrier. The metals employed as hydrogenation catalyst can be used either in the form of a mixture with alumina, magnesia, alumina-magnesia in spinel form, active charcoal, or a carbonate of a metal selected from Group I or II of the Periodic Table, or in the form supported on one of the above mentioned substances.

The organic compounds with at least one unsaturated bond, which are applicable to the dehydrogenation process include acetylene, ethylene, propylene, and cyclic olefines, of which ethylene and propylene are most conveniently applied as they are commercially obtainable at moderate prices.

The following examples illustrate the process of this invention. Here the terms are employed in the following meanings.

Conversion $$= \frac{\text{THAQ present before dehydrogenation (by mol.)} - \text{THAQ present after dehydrogenation (by mol.)}}{\text{THAQ present before dehydrogenation (by mol.)}} \times 100$$

Conversion to anthraquinone $$= \frac{\text{AQ converted from THAQ (in mol.)}}{\text{THAQ present before dehydrogenation (by mol.)}} \times 100$$

Total anthraquinone recovery $$= \frac{\text{AQ+THAQ present after dehydrogenation (by mol.)}}{\text{AQ+THAQ present before dehydrogenation (by mol.)}} \times 100$$

REMARKS.—THAQ: Tetrahydroanthraquinone; AQ: Anthraquinone.

EXAMPLE 1

In a flask provided a thermometer, a stirrer, a reflux condenser and a gas inlet, were placed 100 parts by volume of the solution which comprises 0.0665 mol./l. tetrahydrobutylanthraquinone and 0.607 mol./l. butylanthraquinone dissolved in the mixture of trimethylbenzene and diisobutylcarbinol in the ratio of 50:50 by volume. To the solution were added 10 parts by weight of Pd—MgAl$_2$O$_4$ (Pd 2%) as catalyst and the solution was heated at 164–168° C. for 3 hours, leading a stream of ethylene gas under the normal pressure at a flow rate of 750 parts by volume per hour. The total volume of ethylene gas thus passed amounted to as seven times as the quantity theoretically required. 99% conversion to the corresponding anthraquinone was attained with 100% total anthraquinone recovery.

EXAMPLE 2

Results of some experiments are shown in the following tables. In each experiment, a solution containing a tetrahydroanthraquinone or a mixture of tetrahydroanthraquinone and anthraquinone was placed with a dehydrogenation catalyst and stirred. Dehydrogenation reaction was carried out by passing a gas having at least one unsaturated bond at a specified temperature for a definite reaction time. After the specified reaction time, the solid catalyst was filtered off and the remaining tetrahydroanthraquinone and the produced anthraquinone were polarographically determined to evaluate the conversion and the total anthraquinone recovery.

Table 1 shows the influence of reaction temperature and the reaction time on the conversion. From the data in Table 1, it is calculated that the dehydrogenation velocity is about doubled by 10° C. elevation of the reaction temperature.

Table 1

| Reaction time [1] after preheating (hours) | Conversion (percent) at— | | |
|---|---|---|---|
| | 145° C. | 155° C. | 165° C. |
| 0 | 21.2 | 38.1 | 41.6 |
| 0.5 | 54.7 | 67.1 | 79.3 |
| 1.0 | 68.7 | 82.8 | 92.7 |
| 1.5 | 77.1 | 91.2 | 94.8 |
| 2.0 | 83.6 | 93.5 | 96.2 |
| 3.0 | 90.6 | 94.8 | 99.0 |
| 4.0 | 91.2 | 95.8 | |

[1] The time of arrival of a specified temperature was assigned with 0 hrs

Remarks:
  Sample: Amylanthraquinone, 0.607 mol./l.+amyl-tetrahydroanthraquinone 0.0665 mol./l.
  Catalyst: Pd (2%)—Al$_2$O$_3$.MgO spinel (250–300 mesh), 100 g./l.
  Solvent: Trimethylbenzene: diisobutylcarbinol =50:50 by volume.
  Total anthraquinone recovery: 97–100%.
  Gas stream: Ethylene.

Table 2 illustrates the conversion and the total anthraquinone recovery with the kind of catalyst. As obvious from the table, Pd (or Pd black) or Pd—SiO$_2$, Pd—Ca$_3$(PO$_4$)$_2$ cannot induce the dehydrogenation and Pd on carbonate can effect a weak dehydrogenation, while Pd—Al$_2$O$_3$, Pd-spinel, Pd—MgO and Pd—C are connected to high degree of conversion, especially Pd-spinel and Pd—MgO being excellent and showing a conversion of 99% and a total anthraquinone recovery of 100%.

Table 2

| | 1 | 2 | 3 | 4 | 5 | 6 | 7 | 8 | 9 | 10 |
|---|---|---|---|---|---|---|---|---|---|---|
| Catalyst | Pd-Al$_2$O$_3$ (Pd 2%) | Pd-Al$_2$O$_3$ (Pd 2%) | Pd-MgAl$_3$O$_4$ (Pd 2%) | Pd-MgO | Pd-C (Pd 1%) | Pd-MgCO$_3$ (Pd 4%) | Pd-NaCO$_3$ (Pd 4%) | Pd-Ca$_3$(PO$_4$)$_2$ (Pd 2%) | Pd-SiO$_2$ (Pd 3%) | Pd (without carrier) |
| Amount of catalyst employed (g./l.) | 100 | 80 | 100 | 100 | 80 | 100 | 100 | 100 | 50 | 10.0 |
| Concentration (mol./l.): | | | | | | | | | | |
| Amylanthraquinone | 0.607 | 0.638 | 0.607 | 0.607 | 0.607 | 0.607 | 0.607 | 0.607 | 0.607 | 0.607 |
| Tetrahydroamylanthraquinone | 0.0665 | 0.0742 | 0.0665 | 0.0665 | 0.0665 | 0.0665 | 0.0665 | 0.0665 | 0.0665 | 0.0665 |
| Gas passed in stream | N$_2$ | Ethylene | Ethylene | Ethylene | Ethylene | Ethylene | Ethylene | Ethylene | Ethylene | Ethylene |
| Reaction temp. (° C.) | 164–168 | 164–168 | 164–168 | 164–168 | 164–167 | 163–165 | 163–164 | 164–168 | 164–168 | 164–168 |
| Reaction time (hrs.) | 3.0 | 1.0 | 3.0 | 3.0 | 2.5 | 3.0 | 3.0 | 3.0 | 3.0 | 3.0 |
| Conversion (percent) | 56.8 | 70.8 | 99.0 | 99 | 57.3 | 12.0 | 29.5 | 0 | 0 | 0 |
| Conversion to anthraquinone (percent) | 39.2 | 70.8 | 99.0 | 99 | 53.4 | 10.8 | 23.6 | 0 | 0 | 0 |
| Total anthraquinone recovery (percent) | 69.0 | 100.0 | 100.0 | 100 | 95 | 90 | 80 | | | |

Remarks: As solvent a mixture of trimethylbenzene and diisobutylcarbinol in the volume ration of 50:50 was used.

Table 3 illusrates the influence of the tetrahydroanthraquinone to anthraquinone ratio and of the kind of solvent employed at the conversion and the total anthraquinone recovery. The data in the table shows that the present invention can be carried out practically independent of the tetrahydroanthraquinone to anthraquinone ratio and also of the kind of solvent used. Experiments conducted by using ethylen and propylene, respectively, gave substantially the same results. Table 4 shows the results of comparison between Pd, Pt and Ni. As seen in the table, these metals are not substantially different from one another in respect of catalytic activity.

Table 3

| Solvent (vol. ratio) | 1<br>TMB | 2<br>TMB | 3<br>TMB-DIBC<br>(50:50) | 4<br>TMB-DIBC<br>(50:50) | 5<br>TMB-DIBC<br>(50:50) | 6<br>TMB-DIBC<br>(50:50) | 7<br>TMB-DIBC-AP<br>(40:30:30) |
|---|---|---|---|---|---|---|---|
| Amylanthraquinone | 0.0914 | 0.435 | | | 0.607 | 0.355 | 0.500 |
| Tetrahydroamylanthraquinone (Concn. (mol./l.)) | 0.457 | 0.041 | 0.0707 | 0.0707 | 0.0665 | 0.355 | 0.0638 |
| Amount of catalyst, g./l. | 129 | 129 | 20 | 40 | 100 | 100 | 80 |
| (The same in gram ratio to tetrahydroamylanthraquinone) | (1.0) | (11.0) | (1.0) | (2.0) | | (1.0) | |
| Gas passed in stream | Ethylene | Propylene | Ethylene | Ethylene | Ethylene | Ethylene | Ethylene |
| Reaction temp. (° C.) | 155–160 | 155–160 | 155–165 | 157–160 | 164–168 | 158–160 | 165–168 |
| Reaction time (hrs.) | 2.0 | 2.0 | 3.0 | 3.0 | 3.0 | 3.0 | 3.0 |
| Conversion (percent) | 99.7 | 99.4 | 80.5 | 98.5 | 99.0 | 98.0 | 95.9–97.3 |
| Conversion to anthraquinone (percent) | 99.7 | 99.4 | 80.2 | 97.0 | 99.0 | 91.6 | 95.9–97.3 |
| Total anthraquinone recovery (percent) | 100.0 | 100.0 | 99.9 | 98.5 | 100.0 | 93.6 | 100.0 |

Remarks: 1) TMB, DIBC and AP stand for trimethylbenzene, diisobutylcarbinol and acetophenone, respectively. 2) As catalyst, Pd-MgAl₂O₄ (Pd 2%) was used in all cases.

Table 4

| Catalyst | 1<br>Pd-MgAl₂O₄<br>(Pd 2%) | 2<br>Pt-MgAl₂O₄<br>(Pt 2%) | 3<br>Ni-MgAl₂O₄<br>(Ni 2%) |
|---|---|---|---|
| Amount of catalyst employed (g./l.) | 100.0 | 80.0 | 80 |
| Concentration (mol./l.): | | | |
| Amylanthraquinone | 0.607 | 0.638 | 0.626 |
| Tetrahydroamylanthraquinone | 0.0665 | 0.0742 | 0.0752 |
| Gas passed in stream | Ethylene | Ethylene | Ethylene |
| Reaction temp. (° C.) | 164–168 | 165–168 | 164–168 |
| Reaction time (hrs.) | 3.0 | 3.0 | 3.00 |
| Conversion (percent) | 99.0 | 95.9 | 88.5 |
| Conversion to anthraquinone (percent) | 99.0 | 95.9 | 85.5 |
| Total anthraquinone recovery (percent) | 100.0 | 100.0 | 96.3 |

Remarks: In all cases, a solvent comprising trimethylbenzene and diisobutylcarbinol in the vol. ratio of 50:50 was used.

What we claim is:

1. In a process for the production of hydrogen peroxide, the step for the dehydrogenation of tetrahydroanthraquinone to the corresponding anthraquinone which comprises introducing into a solution of said tetrahydroanthraquinone a hydrogen acceptor selected from the group consisting of acetylene, olefines in gaseous form and cyclic olefines in gaseous form, in the presence of a dehydrogenation catalyst selected from the group consisting of alumina, magnesia, alumina-magnesia in spinel form, active carbon, magnesium carbonate, sodium carbonate and potassium carbonate, together with a hydrogenation catalyst selected from the group consisting of palladium, platinum and nickel.

2. A process as claimed in claim 1 wherein the tetrahydroanthraquinone is an alkylated tetrahydroanthraquinone.

3. A process as claimed in claim 1 wherein anthraquinone is contained in said solution at the start of the reaction.

4. The process as claimed in claim 1 wherein the dehydrogenation reaction is effected at a temperature between 80 and 300° C.

5. The process as claimed in claim 4 wherein the dehydrogenation treatment is effected at about atmospheric pressure.

6. A process as claimed in claim 1 wherein said hydrogen acceptor is ethylene.

7. A process as claimed in claim 1, wherein said hydrogen acceptor is propylene.

References Cited in the file of this patent
UNITED STATES PATENTS

| 2,739,042 | Corey et al. | Mar. 20, 1956 |
| 2,948,739 | Harris et al. | Aug. 9, 1960 |